(12) United States Patent
Chen et al.

(10) Patent No.: US 9,384,398 B2
(45) Date of Patent: Jul. 5, 2016

(54) METHOD AND APPARATUS FOR ROOF TYPE CLASSIFICATION AND RECONSTRUCTION BASED ON TWO DIMENSIONAL AERIAL IMAGES

(71) Applicant: HERE Global B.V., Veldhoven (NL)

(72) Inventors: Xin Chen, Evanston, IL (US); Andi Zang, Chicago, IL (US); Xi Zhang, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 11 days.

(21) Appl. No.: 14/301,752

(22) Filed: Jun. 11, 2014

(65) Prior Publication Data
US 2015/0363645 A1 Dec. 17, 2015

(51) Int. Cl.
*G06K 9/00* (2006.01)
*G06T 7/00* (2006.01)
*G06K 9/62* (2006.01)

(52) U.S. Cl.
CPC .......... *G06K 9/00637* (2013.01); *G06K 9/6267* (2013.01); *G06T 7/0081* (2013.01); *G06T 2207/10004* (2013.01); *G06T 2207/10032* (2013.01); *G06T 2207/30184* (2013.01)

(58) Field of Classification Search
CPC . G06F 17/5004; G06F 17/50; G06F 17/5018; G06T 7/0081; G06T 7/0083; G06T 2207/10016; G06T 2207/20144; G06K 9/00637
See application file for complete search history.

(56) References Cited

U.S. PATENT DOCUMENTS

| | | | |
|---|---|---|---|
| 6,721,684 B1 * | 4/2004 | Saebi | E04B 1/167 702/183 |
| 7,509,241 B2 * | 3/2009 | Guo | G06F 17/5004 345/419 |
| 7,752,018 B2 * | 7/2010 | Rahmes | G06K 9/00637 703/1 |
| 8,352,220 B2 * | 1/2013 | Wayne | G06F 17/50 136/246 |
| 8,977,520 B2 * | 3/2015 | Stephens | G06F 17/5004 703/1 |
| 2011/0206274 A1 * | 8/2011 | Tateno | G06T 7/0046 382/154 |
| 2013/0096886 A1 * | 4/2013 | Vorobyov | G01C 11/00 703/1 |
| 2014/0067332 A1 * | 3/2014 | Chen | G06F 17/5004 703/1 |

* cited by examiner

*Primary Examiner* — Amir Alavi
(74) *Attorney, Agent, or Firm* — Alston & Bird LLP

(57) ABSTRACT

A method, apparatus and computer program product are provided for roof type classification and reconstruction based on two dimensional aerial images. In the context of a method, the method includes receiving a roof image, determining a segmentation of the roof image based on cutting lines associated with roof features and classifying roof segments based on roof features within the segment. The classifying roof segments is based on the roof features correlation to a roof type pattern.

18 Claims, 14 Drawing Sheets

METHOD AND APPARATUS FOR ROOF TYPE CLASSIFICATION AND RECONSTRUCTION BASED ON TWO DIMENSIONAL AERIAL IMAGES

TECHNOLOGICAL FIELD

An example embodiment of the present invention relates to three dimensional rendering and, more particularly, to a method, apparatus and computer program product for roof type classification and reconstruction based on roof images.

BACKGROUND

In some visual rendering systems rooftops of building are rendered based a two dimensional image, such as provided by aerial photography. These rendering systems may use the outline or footprint of the building and assign a probable roof type for rendering. In other visual rendering systems the footprint and some roof features may be used to determine a roof type for the building.

BRIEF SUMMARY

A method, apparatus and computer program product are provided in accordance with an example embodiment for roof type classification and reconstruction based on two dimensional aerial images. In an example embodiment, a method is provided that includes receiving a roof image, determining a segmentation of the roof image based on cutting lines associated with roof features, and classifying roof segments based on roof features within the segment. The classifying the roof segments is based on the roof features correlation to a roof type pattern. In an example embodiment, the method also includes determining a plurality of points of interest associated with the roof image and the candidate cutting lines are based on the points of interest. In an example embodiment of this method, the roof image comprises a roof footprint and determining a point of interest comprising determining points at which the angle of the footprint satisfies a predetermined angle threshold.

In an example embodiment, the method also includes determining candidate cutting lines based on the points of interests. The determining a segmentation of the roof image comprises determining a plurality of segment combinations based on the candidate cutting lines and points of interest and selecting a segment combination based on satisfying a predetermined probability threshold. In some example embodiments, the method also includes classifying the roof based on the roof segment classification.

In an example embodiment, the method also includes determining if the roof features satisfy a predetermined edge threshold, and if the roof image does not satisfy the predetermined edge threshold a mean shift is applied to the roof image. In some example embodiments, the method also includes determining if at least a portion of the roof image satisfies a predetermined scale threshold. If the at least a portion of the roof image does not satisfy the predetermined scale threshold, the roof image is adjusted to satisfy the predetermined scale threshold.

In another example embodiment an apparatus is provided including at least one processor and at least one memory including computer program code with the at least one memory and computer program code configured to, with the processor, cause the apparatus to at least receive a roof image, determine a segmentation of the roof image based on cutting lines associated with roof features, and classify roof segments based on roof features within the segment. The classifying the roof segments is based on the roof features correlation to a roof type pattern. In an example embodiment, the at least one memory and the computer program code are further configured to determine a plurality of points of interest associated with the roof image, and the candidate cutting lines are based on the points of interest.

In some example embodiments of the apparatus, the roof image comprises a roof footprint; and determining a point of interest comprising determining points at which the angle of the footprint satisfies a predetermined angle threshold.

In an example embodiment of the apparatus, the at least one memory and the computer program code are further configured to determine candidate cutting lines based on the points of interests. The determining a segmentation of the roof image includes determining a plurality of segment combinations based on the candidate cutting lines and points of interest, and selecting a segment combination based on satisfying a predetermined probability threshold. In some example embodiments of the apparatus, the at least one memory and the computer program code are further configured to classify the roof based on the roof segment classification.

In an example embodiment, the at least one memory and the computer program code are further configured to determine if the roof features satisfy a predetermined edge threshold, and if the roof image does not satisfy the predetermined edge threshold a mean shift is applied to the roof image. The at least one memory and the computer program code, of an example embodiment of the apparatus, are further configured to determine if at least a portion of the roof image satisfies a predetermined scale threshold and if the at least a portion of the roof image does not satisfy the predetermined scale threshold the roof image is adjusted to satisfy the predetermined scale threshold.

In a further example embodiment, a computer program product is provided comprising at least one non-transitory computer-readable storage medium having computer-executable program code portions stored therein with the computer-executable program code portions comprising program code instructions configured to receive a roof image determine a segmentation of the roof image based on cutting lines associated with roof features and classify roof segments based on roof features within the segment. The classifying the roof segments is based on the roof features correlation to a roof type pattern. In an example embodiment of the computer program product, the computer-executable program code portions further comprise program code instructions configured to determine a plurality of points of interest associated with the roof image and the candidate cutting lines are based on the points of interest. In an example embodiment of this computer program product, the roof image comprises a roof footprint and determining a point of interest comprising determining points at which the angle of the footprint satisfies a predetermined angle threshold.

In an example embodiment of the computer program product, the computer-executable program code portions further comprise program code instructions configured to determine candidate cutting lines based on the points of interests. The determining a segmentation of the roof image includes determining a plurality of segment combinations based on the candidate cutting lines and points of interest; and selecting a segment combination based on satisfying a predetermined probability threshold. In an example embodiment of the computer program code, the computer-executable program code portions further comprise program code instructions configured to classify the roof based on the roof segment classification.

In some example embodiments of the computer program product, the computer-executable program code portions further comprise program code instructions configured to determine if the roof features satisfy a predetermined edge threshold, and if the roof image does not satisfy the predetermined edge threshold a mean shift is applied to the roof image. In an example embodiment of the computer program product, the computer-executable program code portions further comprise program code instructions configured to determine if at least a portion of the roof image satisfies a predetermined scale threshold and if the at least a portion of the roof image does not satisfy the predetermined scale threshold the roof image is adjusted to satisfy the predetermined scale threshold.

In yet another example embodiment, an apparatus is provided that includes means for receiving a roof image, means for determining a segmentation of the roof image, based on cutting lines associated with roof features, and means for classifying roof segments based on roof features within the segment. The classifying is based on the roof features correlation to a roof type pattern.

BRIEF DESCRIPTION OF THE DRAWINGS

Figure 1:
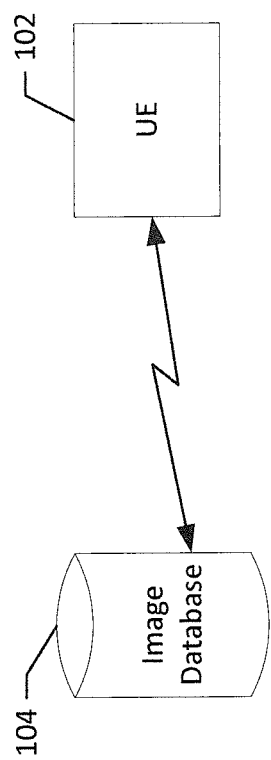
Figure 2:
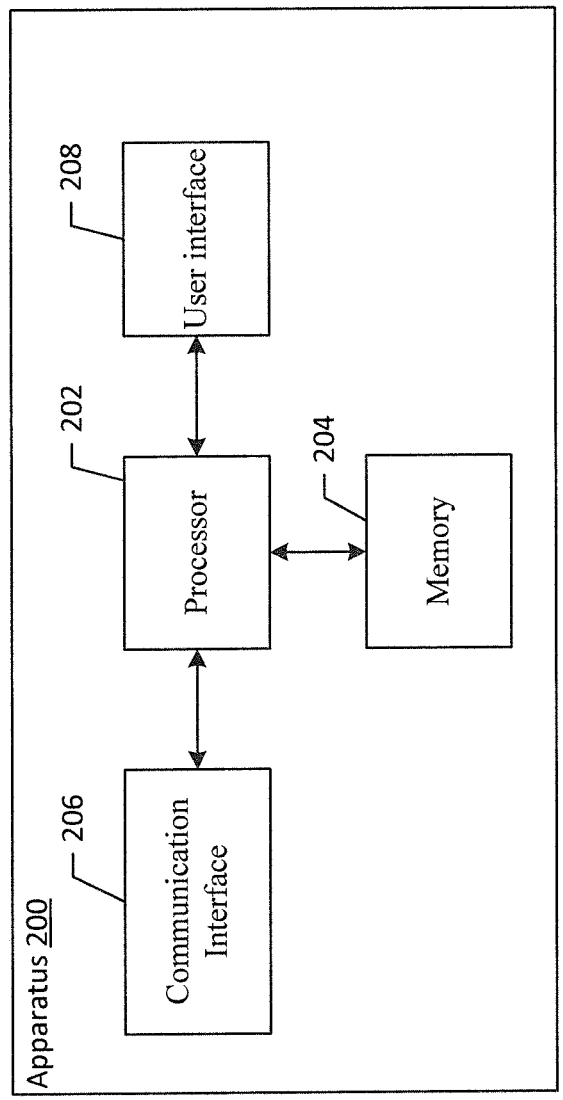
Figure 3:
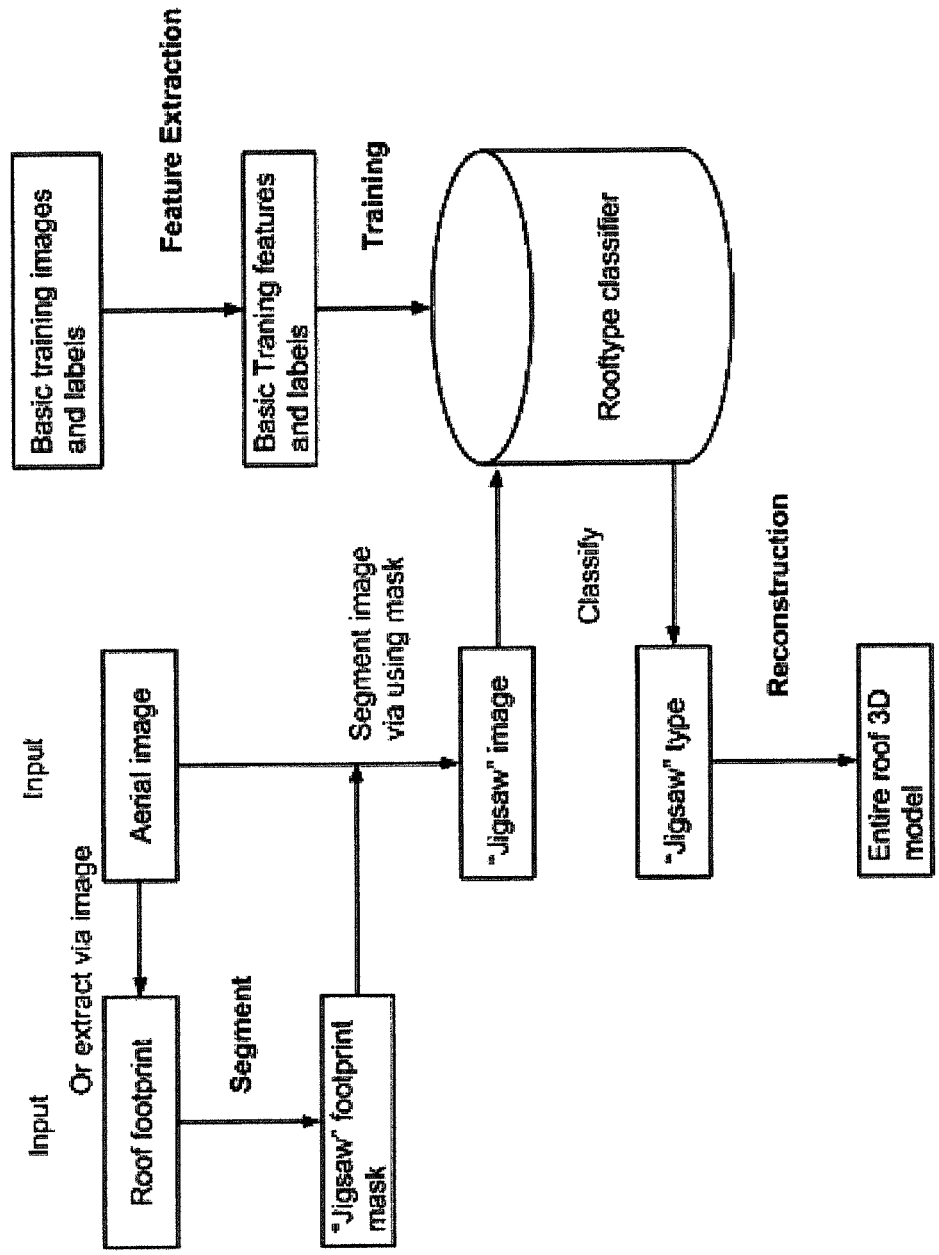
Figure 4:
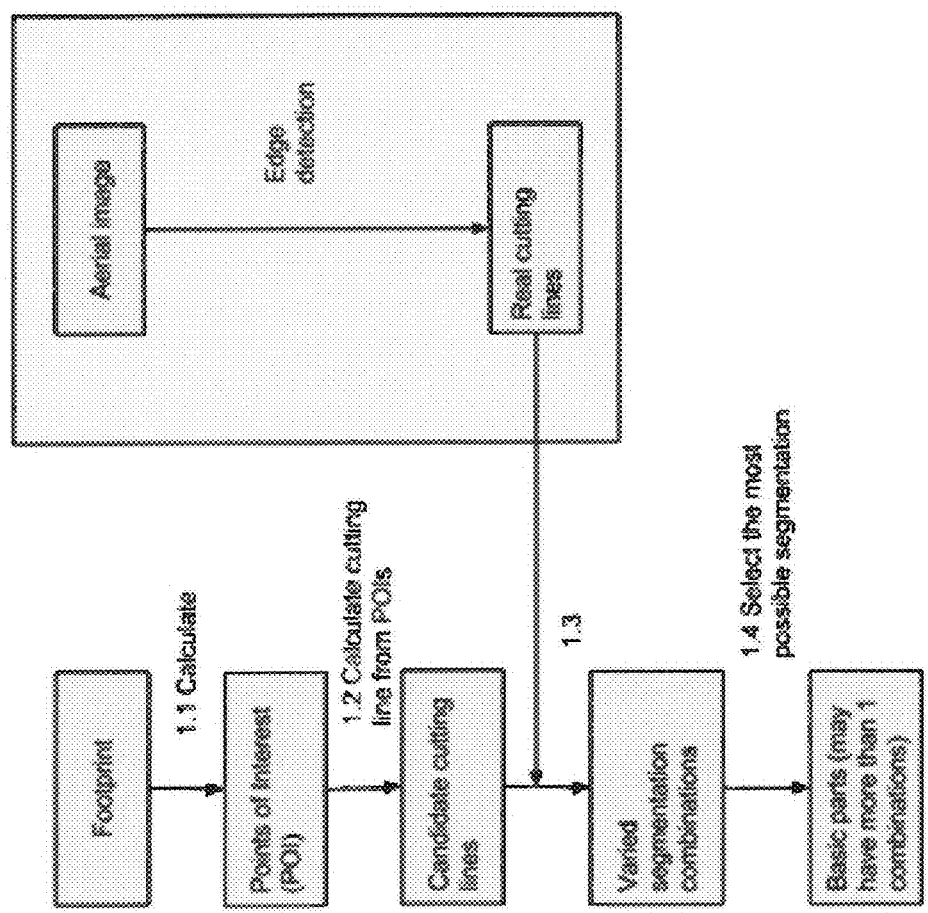
Figure 5:
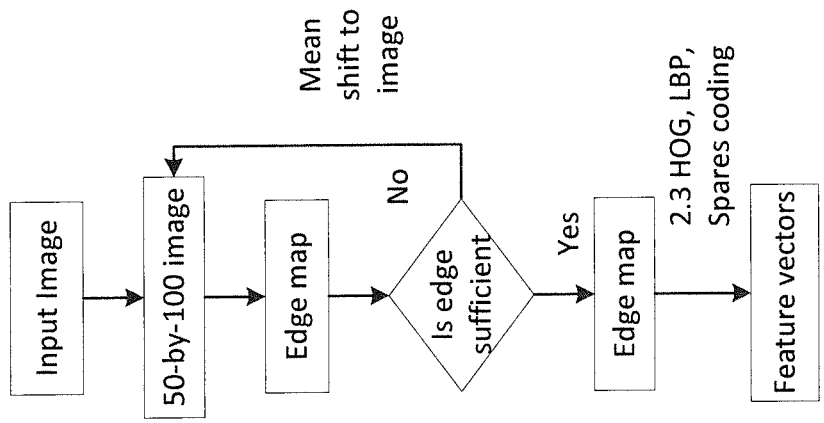
Figure 6:
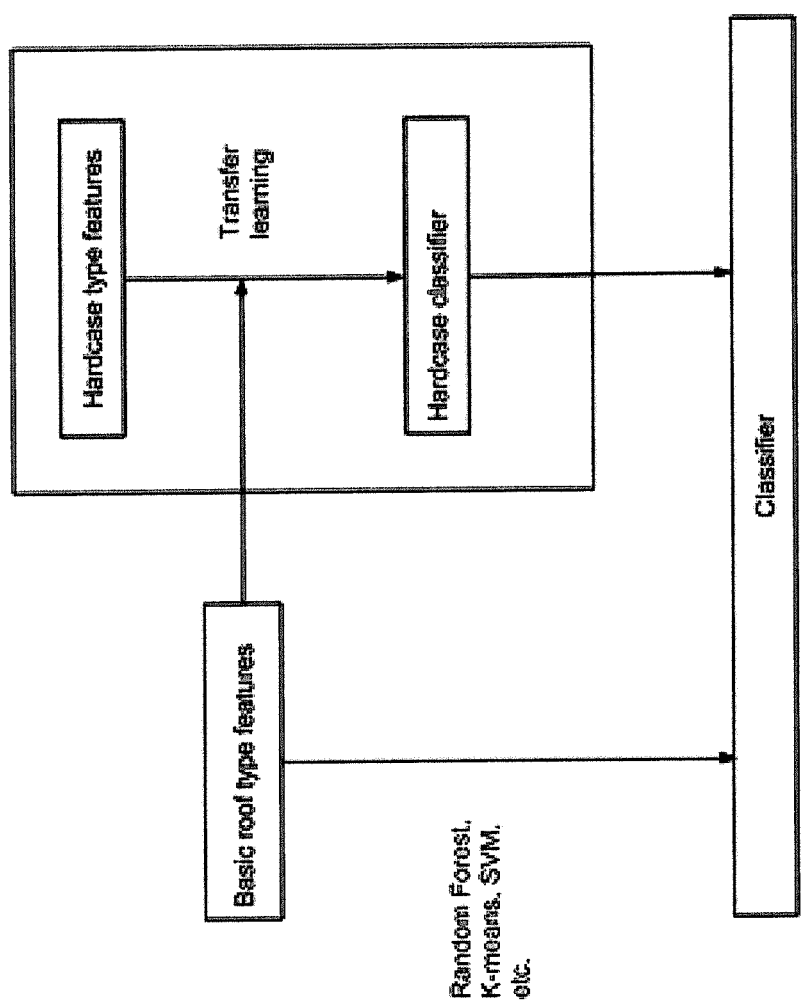
Figure 7:
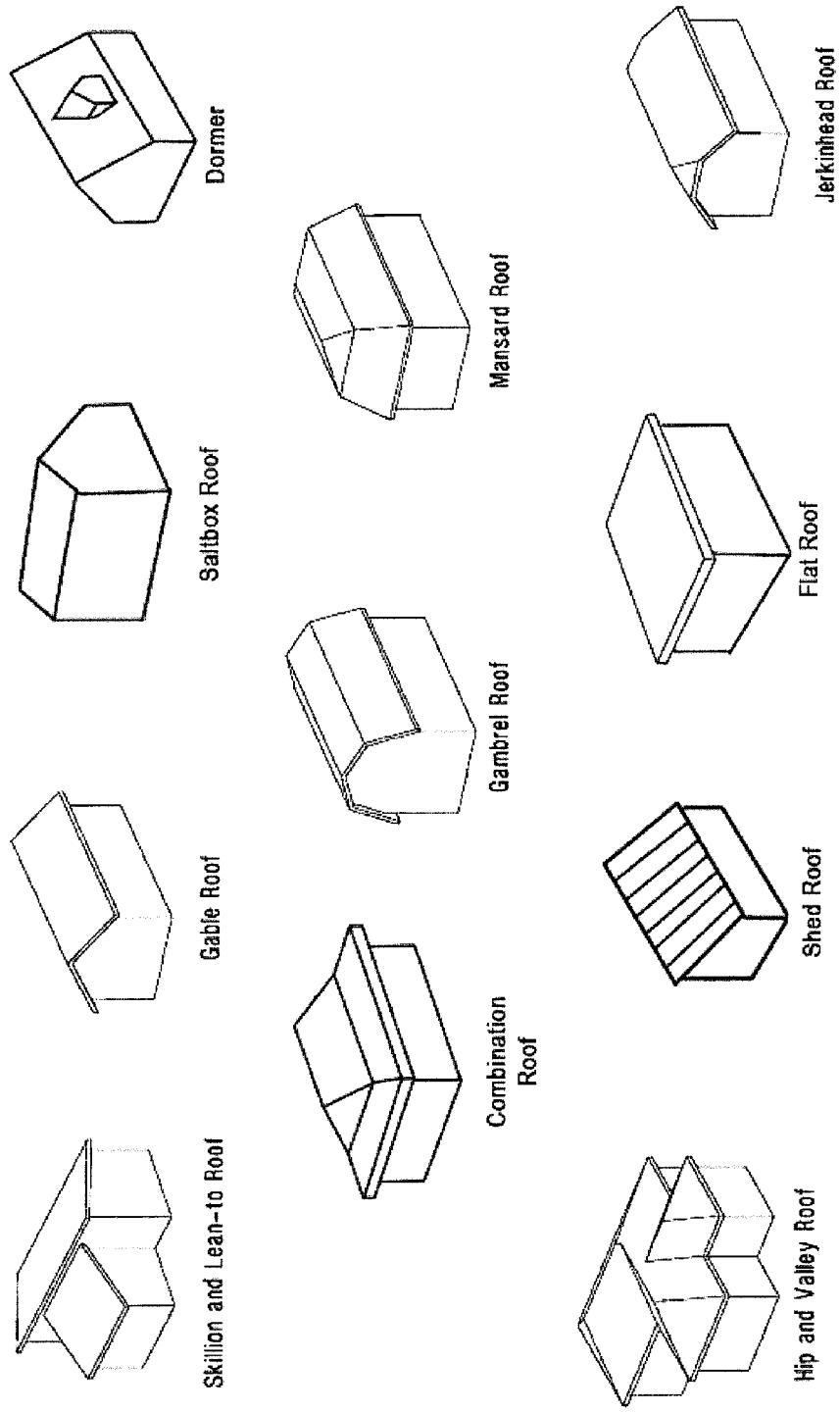
Figure 8:
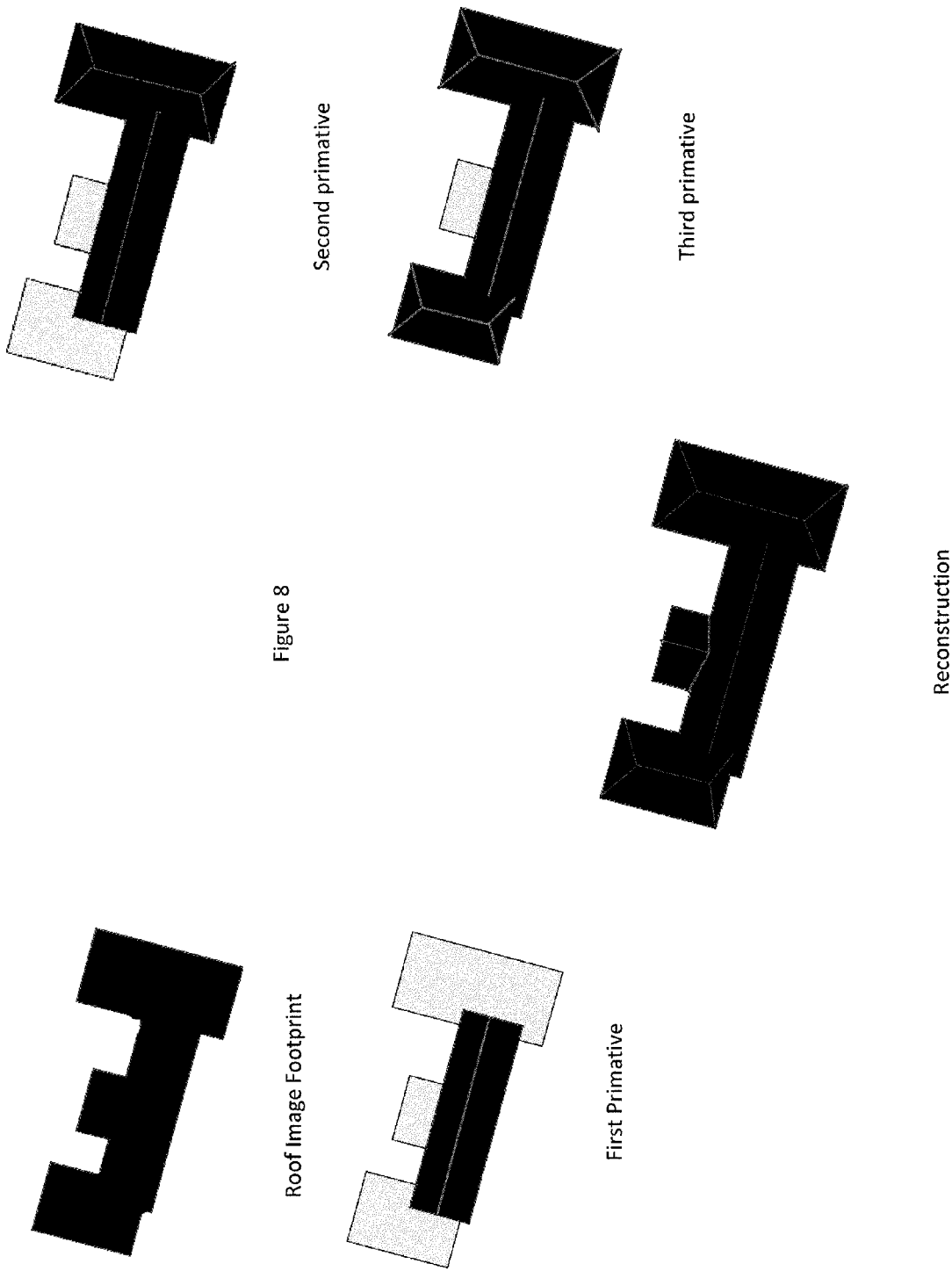
Figure 17:
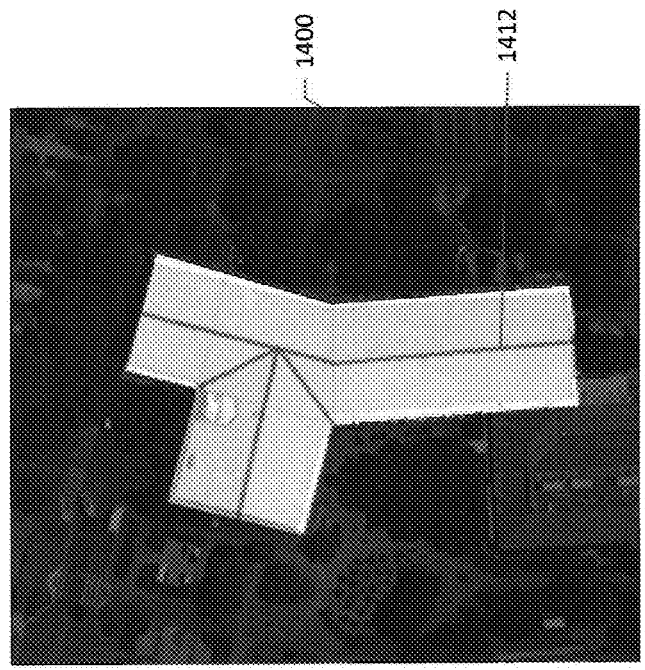
Figure 16:
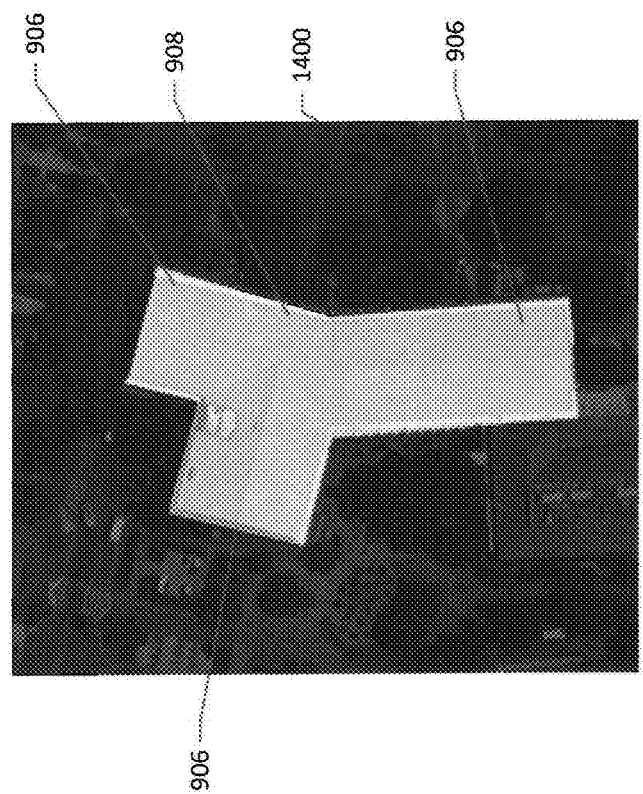
Figure 18:
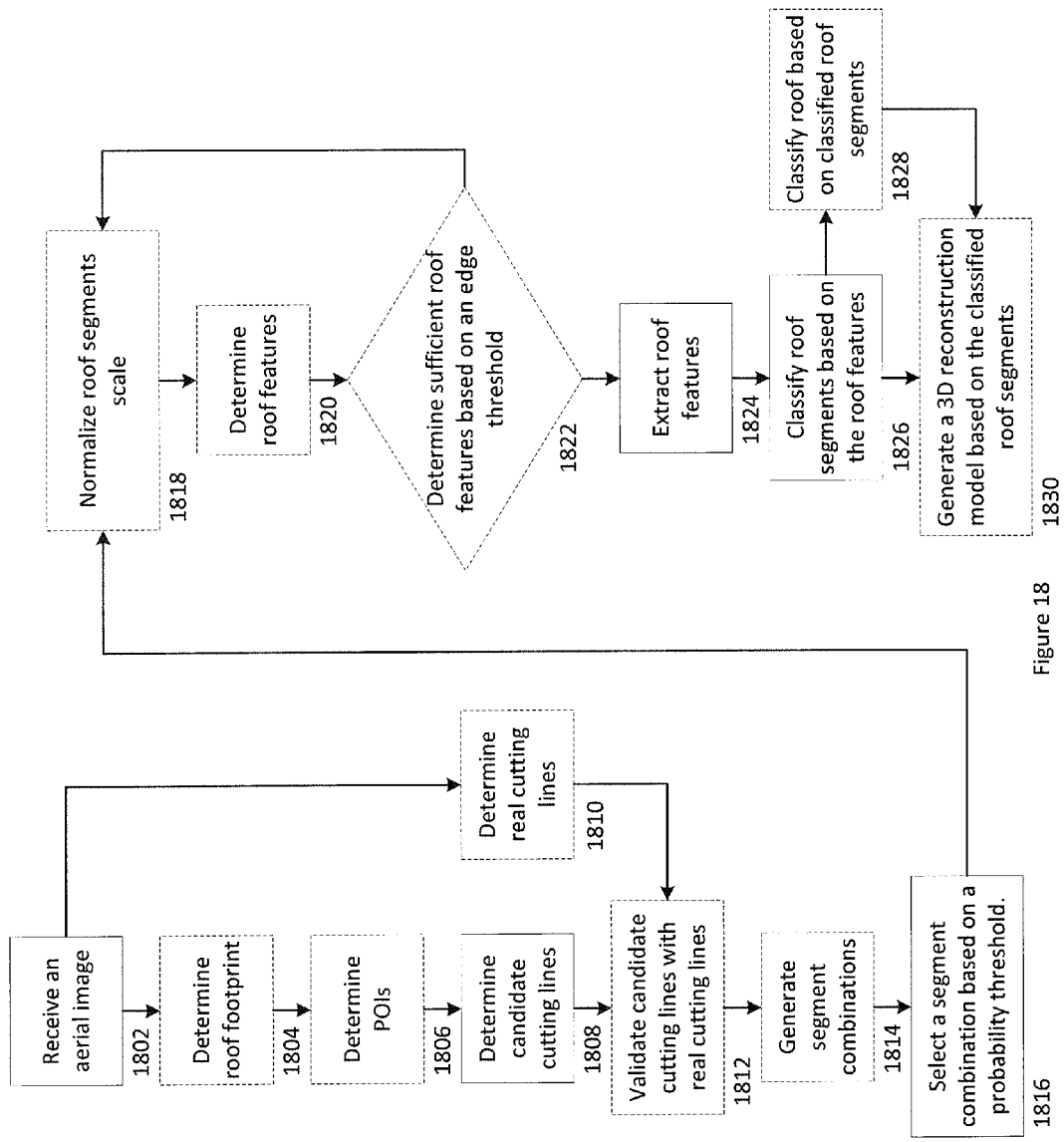

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for roof type classification and reconstruction based on two dimensional areal images in accordance with an example embodiment of the present invention;

FIG. 3 illustrates an example process for classification of roof types in accordance with an example embodiment of the present invention;

FIG. 4 illustrates an example segmentation process in accordance with an embodiment of the present invention;

FIG. 5 illustrates an example roof feature extraction process in accordance with an example embodiment of the present invention;

FIG. 6 illustrates an example roof type classification process in accordance with an embodiment of the present invention;

FIG. 7 illustrates example roof type construction and styles in accordance with an embodiment of the present invention;

FIG. 8 illustrates an example reconstruction of a three dimensional model in accordance with an embodiment of the present invention;

FIGS. 9-17 illustrate example images of the roof type classification and reconstruction process; and FIG. 18 is a flow chart illustrating the operations performed, such as by the apparatus of FIG. 2, in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product (s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

OVERVIEW

Digital reconstruction and/or rendering of rooftops may be more accurate to the true construction of the roofs by segmenting the roof into smaller portions and classifying each segment. The classification of different segments may allow for more complex roofs to be classified and rendered. Additionally, the segmentation of the roofs may allow for the rendering of roofs with variant roof construction.

The use of a basic and complex roof classification system may allow for faster and more reliable classification and rendering. Additionally, the machine learning feedback of roof classification increases the accuracy of classification of roof segments.

The rendering system may be able to classify and reconstruct most buildings with complex polygonal footprints and most roof types, based on one or more two dimensional images.

Communications Diagram

A method, apparatus and computer program product are provided in accordance with an example embodiment for roof type classification and reconstruction based on two dimensional aerial images. FIG. 1 illustrates a communication diagram including user equipment (UE) 102, in data communications with a image database 104. The UE 102 may include the image database 104, such as a local image data memory, or be associated with the image database, such as a remote image data server. The UE 102 may be a mobile computing device, such as a laptop computer, tablet computer, mobile phone, smart phone, navigation unit, personal data assistant, or the like. Additionally or alternatively the UE 102 may be a fixed computing device, such as a personal computer, computer workstation, kiosk, office terminal computer or system, or the like.

The UE 102 may receive an aerial image from the image database 104 for roof type classification and three dimensional reconstruction and/or rendering. The aerial image may an image which includes at least one building or structure from a substantially overhead position, e.g. the image is taken looking down upon the roof of the structure or structures. The UE 102 may determine a segmentation of the roof from the roof image based on cutting lines associated with various roof features. The UE 102 may classify the roof segments based on roof features within the respective roof segments. The UE 102 may generate and render a two or three dimensional reconstruction of the roof based on the roof segment classifications.

Example Apparatus

A UE 102 may include or otherwise be associated with an apparatus 200 as shown in FIG. 2. The apparatus, such as that shown in FIG. 2, is specifically configured in accordance with an example embodiment of the present invention for roof type classification and reconstruction based on two dimensional aerial images. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 200 may be embodied by UE 102. However, in some embodiments, the apparatus may be embodied as a chip or chip set. In other words, the apparatus may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data from/to a communications device in communication with the apparatus, such as to facilitate communications with one or more user equipment 102, or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example Classification Process

FIG. 3 illustrates an example process for classification of roof types in accordance with an example embodiment of the present invention. An aerial image, such as aerial image 900 of FIG. 9 and 1400 of FIG. 1400, and/or a roof footprint, such as roof footprint 902 of FIG. 10 and 1400 of FIG. 15, may be input to the UE 102 for classification and/or reconstruction. In some embodiments in which an aerial image is input, the UE 102 may extract a roof footprint, such as by applying an image mask. The roof footprint, or in an instance in which the aerial image is processed without footprint extraction, the aerial image may be segmented, into smaller portions along cutting lines, such as segments 904 labeled 1-7 of FIG. 11 and discussed in FIG. 4. The segmented image may be referred to as a "jigsaw" image. The jigsaw image may be input into a roof type classifier.

The classifier may be programmed with basic training images, e.g. sample images of various roof types that have been classified and labeled for machine learning. The UE 102 may extract the roof features of the training images and associate these roof features with the labeled roof type of the respective training images. Some example roof types are depicted in FIG. 6, including shed, gable, mansard, gambrel, flat, butterfly, hip, and combination. The roof types depicted in FIG. 6 are for illustrative purposes and do not comprise an exhaustive list of roof types. One of ordinary skill in the art would immediately recognize that there are numerous roof types in addition to those depicted, which the UE 102 may be capable of classifying and reconstructing.

The classifier may extract roof features from each roof segment, as discussed below in FIG. 7. The classifier may compare the roof features of the roof segment to the roof type pattern roof features to determine a correlation to roof type patterns. Roof type patterns may include training images, artificial roof templates, and/or previous classifications of roofs or roof segments. The classifier may classify the respective segments of the jigsaw image based on the correlation of the extracted roof features to roof type patterns. For example, the UE 102 may determine an 82 percent correlation of the extracted roof features of the roof segment with a hip type roof and a 25 percent correlation with a mansard type roof. The UE 102 may classify the roof segment based on the highest correlation, e.g. the hip type roof. In an example embodiment, the UE 102 may classify the roof segment based on the highest correlation in an instance in which the roof segment with the highest correlation has a correlation of at least 50%.

In an example embodiment, the classifier may classify the roof type as a whole based on the classification of the roof segments, such as by classifying the roof type based on the most common classification of the roof segments. For example if three of four segments were classified as gable and the forth was classified as hip, the roof top classifier may classify all four roof segments as gable. In other words the classifier may validate roof segment classifications and reclassify roof segments which are inconsistent with other roof segments.

In some example embodiments, the output aerial image and roof and roof segment classifications are provided as feedback into the classifier for use in the next iteration of classification, and further the machine learning.

The UE 102 may reconstruct the roof based on the roof type classification, such as by utilizing point clouds, as depicted in FIG. 8. In this regard, a point cloud is a plurality of points that may collectively represent a roof or at least points on the roof. The reconstruct may include a three dimensional model of the roof of the building or structure.

Example Segmentation Process

FIG. 4 illustrates an example segmentation process in accordance with an embodiment of the present invention. As discussed in FIG. 3, the UE 102 may receive and process an aerial image and/or a roof footprint associated with an aerial image. In an instance in which the UE 102 receives an aerial image, the UE may preform edge detection, such as local binary pattern (LBP), histogram of oriented gradients (HOG), Haar-like, spares coding, or the like. Edges may include outer edges or perimeter of the roof, ridgelines, and the line. The UE 102 may determine one or more sets of cutting lines, e.g. segmentation lines based on the aerial image edge detection, which may be referred to as "real" cutting lines. In an example embodiment, a user may manually enter the real cutting lines by indicating the real cutting line on the aerial image, by using a user interface, such as a touch screen, selection pointer, or the like.

In an embodiment in which the UE 102 receives or extracts a roof footprint which may include the outer edge or perimeter of the roof. The UE 102 may calculate points of interest (POIs), by determining corners, e.g. points, which have an angle exceeding a predetermined angle threshold, such as 180 degrees. For example a corner at a right angle would have an exterior angle of 270 degrees and be a point of interest. A bend in a building may result in a point at which the exterior angle of one side of the building has an angle of 200 degrees and the opposing side has an interior angle of 200 degrees, therefore each would be a POI. The UE 102 may propagate lines between the respective POIs to generate candidate cutting lines. The UE 102 may merge cutting lines which meet a proximity threshold, reducing the density of candidate cutting lines, and the number of segment combinations derived therefrom.

The UE 102 may generate segment combinations of the roof based on combinations of real cutting lines or candidate cutting lines. In an example embodiment, the real cutting lines determined from the aerial image may be used to limit the number of segment combinations generated. For example, segment combinations that do not include the determined real cutting lines may not be generated, allowing for more complex roofs to be classified and reconstructed, and requiring less processing power.

In an example embodiment, the UE 102 may compare the segment combinations to basic roof patterns and assign a probability factor to the respective segment combinations based on correlation to one or more of the basic roof patterns. In an example embodiment, the UE 102 may assign a probability value to the respective roof segment combinations based on area variances, such as ridgelines. For example, the UE 102 may assign higher probability values based on symmetry of segment combinations, ridge lines at right angle to cutting lines, or the like.

The UE 102 may select the segment combination which satisfies a predetermined probability threshold. The probability threshold may be a static value, such as 60 percent, or variable based on the number of cutting lines. For example, the probability threshold may vary in an inverse manner to the number of cutting lines with the probability threshold being smaller in an instance in which the number of cutting lines is greater. In an instance in which more than one segment combination satisfies the probability threshold, the UE 102 may select the segment combinations with the highest probability.

In an example embodiment, probability values may be determined for individual segments. For example referring to FIG. 11 roof segments 904 labeled 1, 4, and 7 may satisfy the probability threshold, but there may be two probable segment combinations for roof segment 2 and 3, and 5 and 6. In an instance in which there are two or more segment combinations which satisfy the probability threshold, the UE 102 may select both segment combinations for further analysis.

Example Roof Feature Extraction Process

FIG. 5 illustrates an example roof feature extraction process in accordance with an example embodiment of the present invention. The UE 102 may receive the roof image or portion of the roof image associated with a roof segment. The UE 102 may normalize the image for processing by determining if the roof image satisfies a predetermined scale threshold. In an instance in which the roof image does not satisfy the predetermined scale threshold, the UE 102 may adjust the roof image scale to satisfy the predetermined scale threshold. The normalization of the image ensures a uniform scale, such as 50×100 pixels, is used in the process to reduce errors. The normalization may be advantageous since roof segments are not always parallelograms, or even quadrilateral. One such scale adjustment method may include, determining the minimum parallelogram associated with the roof segment, skewing, and/or resizing the roof segment to a rectangle. Other example methods of adjusting the scale of the roof image may include applying morphing transformations and projection to an angle invariant circle, or the like.

The UE 102 may generate an edge map based on the roof image. The UE 102 may generate roof feature edges in the edge map using threshold segmentation based on ridge lines and other roof features. The roof features may be readily detected due to visual contrast, or indicated by shadows, or other such secondary indicators. In an instance in which insufficient edge point are determined, e.g. histogram peaks are too close or discrete, the UE 102 may apply a mean shift to the image and preform the threshold segmentation.

In an example embodiment, the UE 102 may perform a second step threshold segmentation to amplify contrast and clarify roof features. Two step threshold segmentation may allow for analysis of roof images at small resolutions that may have been difficult using a canny edge detector, other corner detection algorithms, single threshold segmentation, or the like.

Additionally or alternatively the UE 102 may use other edge detection methods, such as line segment detector (LSD), canny edge detector, sobel edge detector, or the like to generate the edge map.

The UE 102 may extract roof features for classification using a feature extraction process, such as histogram of oriented gradients (HOG), local binary pattern (LBP), Haar-like, spares coding, or the like. In an example embodiment, feature extraction may be performed using HOG with a 5×5 cell size, 2×2 block size, and a 50 percent overlap.

The UE 102 may determine the roof feature vectors based on the feature extraction, which may be used in roof type classification of roof segments.

Example Roof Type Classification Process

FIG. 6 illustrates an example roof type classification process in accordance with an embodiment of the present invention. The UE 102 may determine if the roof segment features are basic roof type features or complex roof type features. The UE 102 may determine basic or hard case roof type features based on the various aspects of the roof features such as size or number of roof features. For example, the UE 102 may set a threshold number of roof features for a basic roof type, such as 2, 3, or 4 roof features. Referring to FIG. 7, roof types such as jerkinhead, shed, saltbox, flat butterfly, skillion and lean-to, dormer, and gable may be examples of basic roof types. In contrast, mansard, gambrel, hip and valley, and combination roofs may be examples of hard case roof types. The UE 102 may include a classifier which classifies the roof types as by comparing and determining correlations between the roof segment roof features and roof type patterns, e.g. basic and hard case roof types. The classifier may receive the roof features, roof segments, edge maps, or the like and classify the roof type using ensemble machine learning, such as random forest, k-means, support vector machine (SVM), or the like. The classifier may select the classification of roof segments based on the number or percentage of correlation between the roof segment roof features and the roof type patterns as determined by the ensemble machine learning.

In an example embodiment, the classifier may validate the classification of the roof segments by determining a classification for the roof or a portion of the roof including multiple roof segments. For example, if a roof included three roof segments classified as gable and a fourth classified as mansard, the classifier may invalidate the classification and reclassify the fourth roof segment as the same type as the majority of the roof segments, that is, gable.

In another example embodiment, roof classifications may be validated by a user. The validation of roof classification, by the user, may be especially advantageous during the machine training process.

In some example embodiments, hard case roof type features, or roof type features containing hard case roof type features may be processed by an additional hard case classifier. The hard case classifier may use additional roof types for comparison, e.g. hard case roof types. In further example embodiments, the output of the classifier, and/or hard case classifier e.g. classifications of roofs and/or roof segments associated with an aerial imager is fed back to the hard case and/or classifier as additional comparison data for future classification and machine learning.

In an example embodiment, the classifier may be populated with real, e.g. aerial images for classification training. The use of aerial images alone, may limit the training capability as there is limited training material for hard case roof types.

In an example embodiment, artificial roof templates may be generated and input. An artificial roof template may be an edge template, a grey map template or the like. The classifier may be populated with both aerial images and artificial roof templates for classification training. The additional training material, e.g. the artificial roof templates, may increase the accuracy of the classifications. In an example embodiment, the classifier may determine relationships between the artificial features and real features, e.g. transferred learning, which may be advantageous for hard case classification.

The segment classification may be used to generate a reconstruction of the roof. The UE 102 may generate a two or three dimensional reconstruction of each roof segment based on the classification. The UE 102 may then generate a composite reconstruction by joining the respective roof segments into a single roof reconstruction. An example reconstruction is depicted in FIG. 8, in which each primitive represents a classified roof segment.

Example Images of the Roof Type Classification and Reconstruction Process

Figure 9:
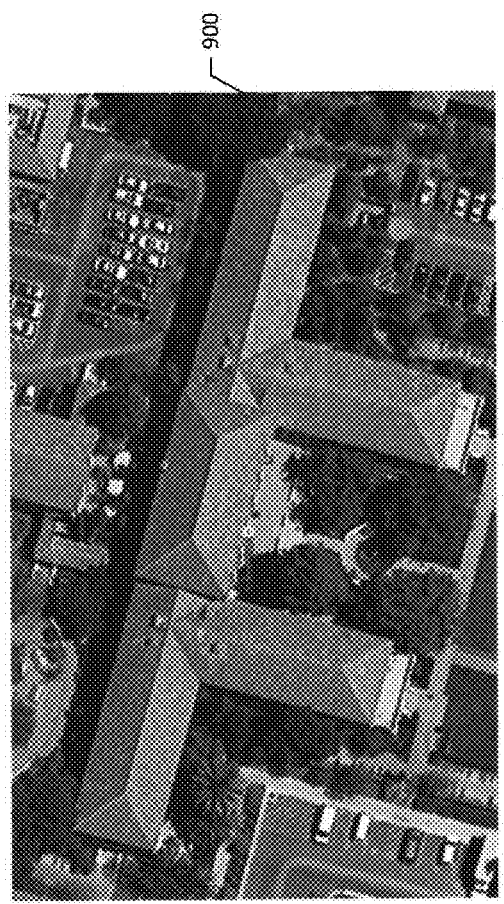
Figure 10:
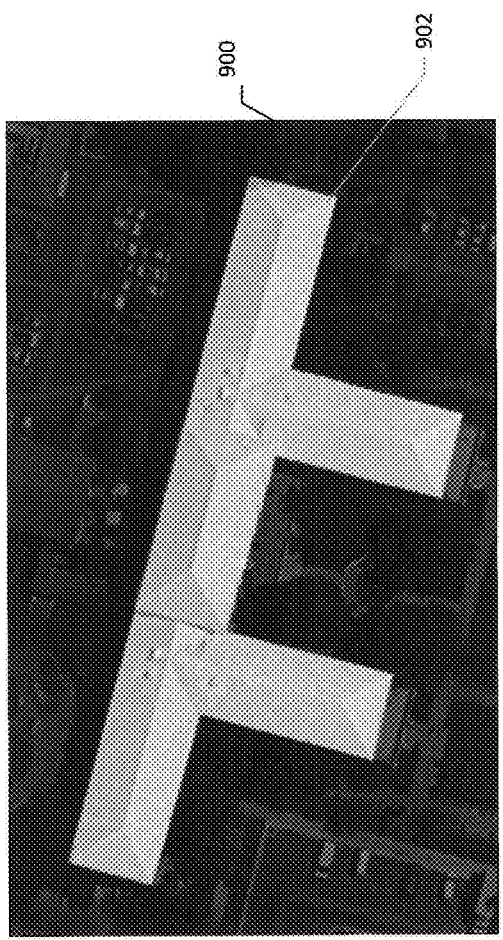
Figure 11:
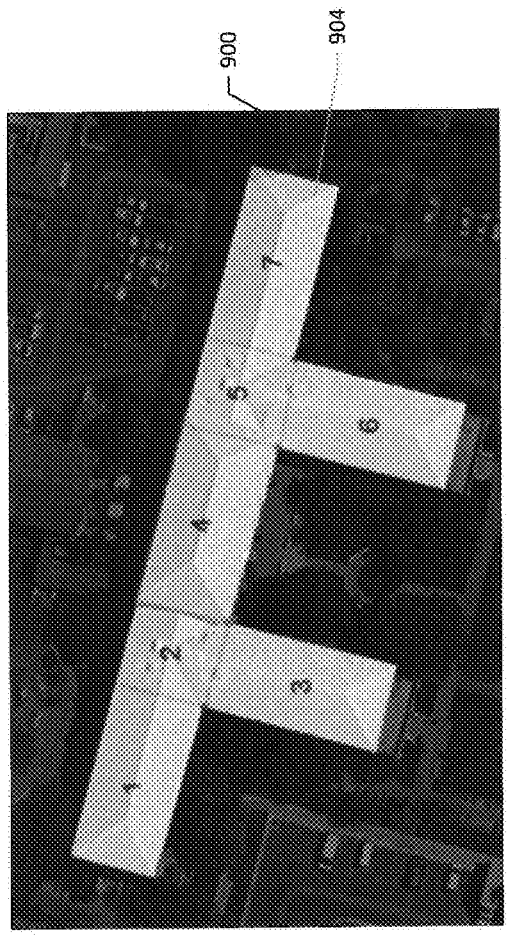
Figure 12:
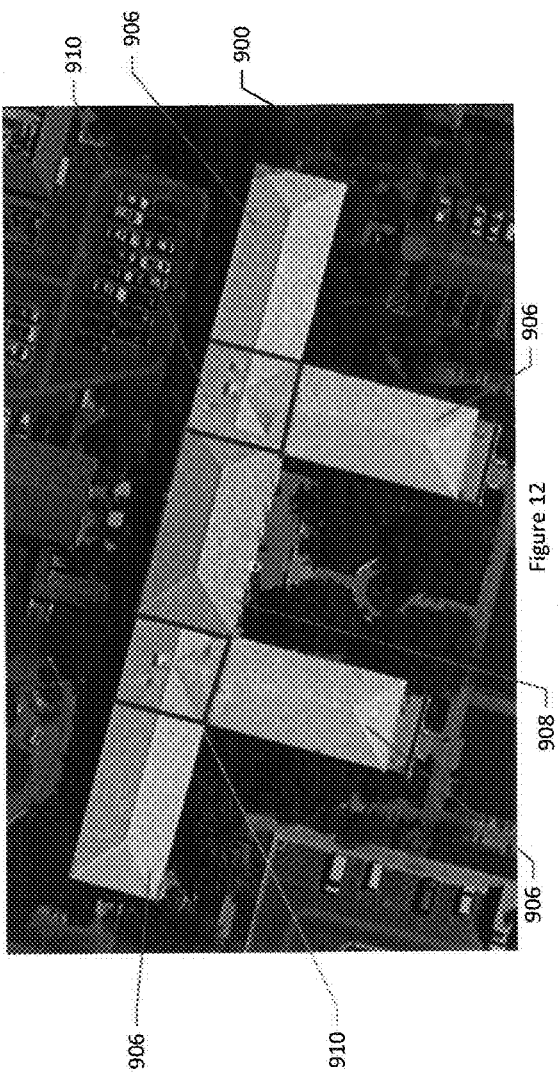
Figure 13:
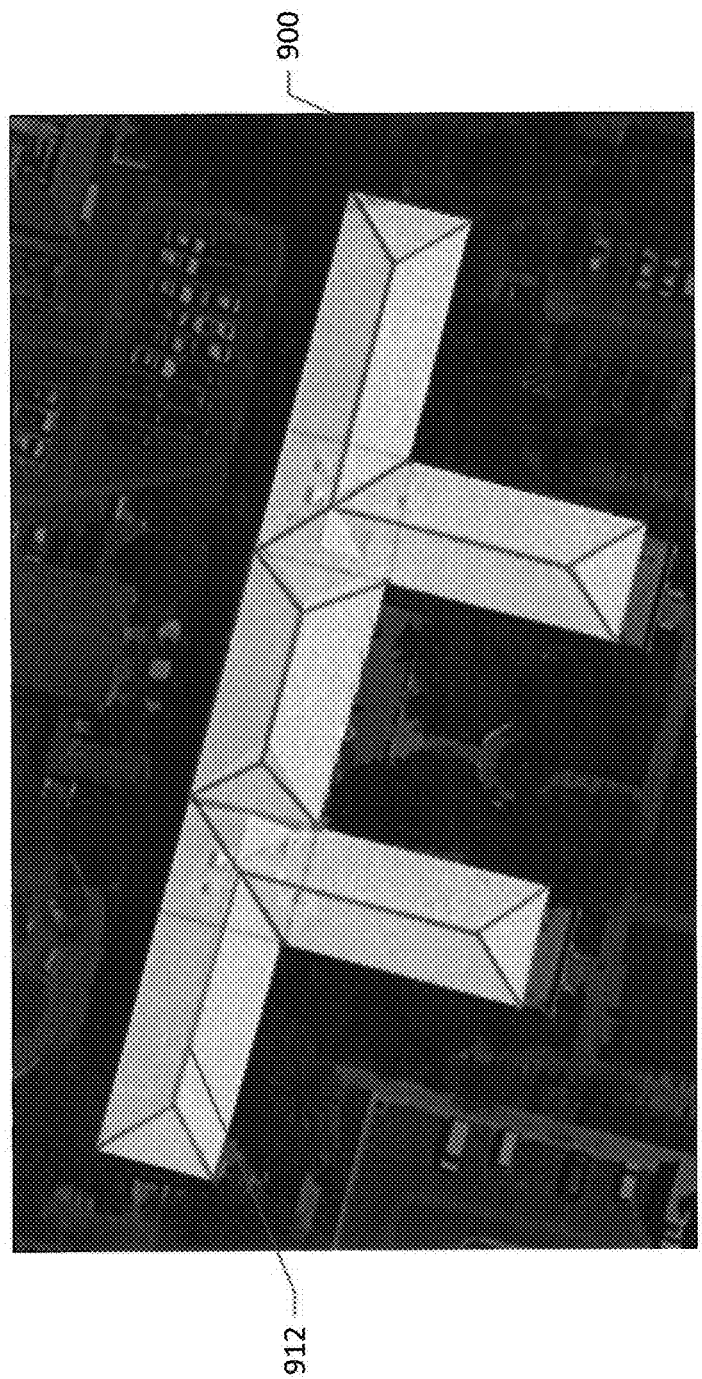
Figure 15:
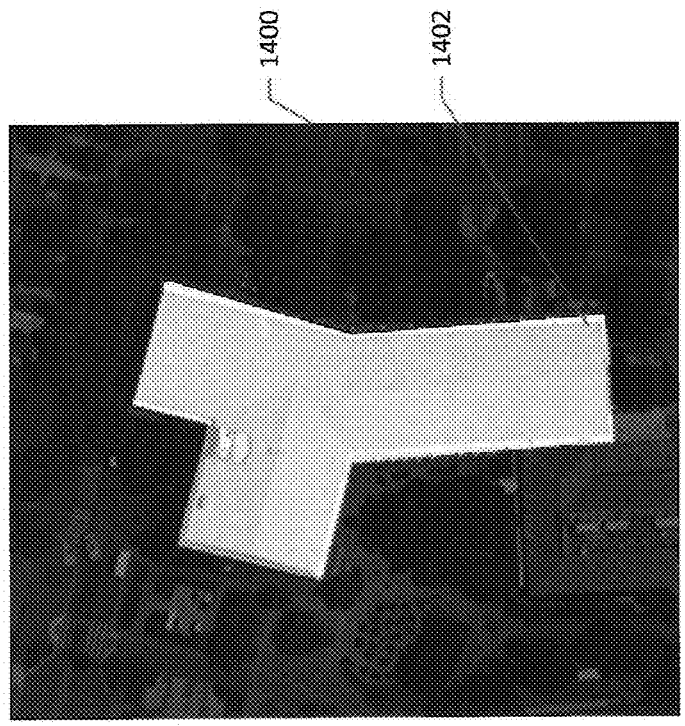
Figure 14:
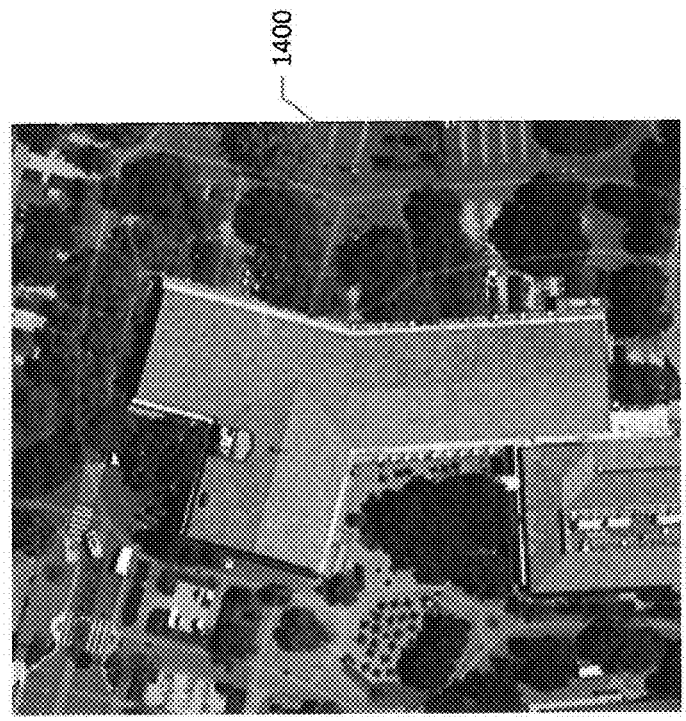

FIGS. 9-17 illustrate example images of the roof type classification and reconstruction process. FIGS. 9 and 14 depict an aerial image 900 and 1400 respectively. FIGS. 10 and 15 depict the aerial image 900/1400 with a roof footprint 902/1402 overlaid on the roof of the structure. FIG. 11 depicts a footprint segment combination. The footprint segments 904 are labels 1-7.

FIG. 12 depicts classification of the roof segments. Roof segments 906 labeled 1, 3, 6, and 7 in FIG. 11, may be classified as combination hip/gable, Roof segment 908 labeled 4 in FIG. 11 may be classified as hip. Roof segments 910 labeled 2 and 5 in FIG. 11 may be classified as combination. FIG. 17 also depicts classification of roof segments. Roof segments 906 may be classified as gable and roof segment 908 may be classified as combination. FIGS. 13 and 17 illustrate a roof ridge frame 912/1412 of a three dimensional reconstruct of the roof.

Example Process for Roof Type Classification and Reconstruction Based on Two Dimensional Aerial Images Referring now to FIG. 18, the operations performed, such as by the apparatus 200 of FIG. 2, for roof type classification and reconstruction may be based on two dimensional aerial images. As shown in block 1802 of FIG. 18, the apparatus 200 may include means, such as a processor 202, a communications interface 206, or the like, configured to receive aerial image data. The processor 202 may receive the aerial image from the communications interface 206, which in turn may receive the aerial image from a memory 204, such as the image database 104.

As shown in block 1804 of FIG. 18, the apparatus 200 may include means, such as a processor 202, or the like, configured to determine a roof footprint. The processor 202 may determine a roof footprint by applying an image mask.

As shown at block 1806, of FIG. 18, the apparatus 200 may include means, such as a processor 202, or the like, configured to determine points of interest (POI). The processor 202 may calculate points of interest by determining points that represent roof corners with an angle that satisfies a predetermined angle threshold, such as 180 degrees. The POI, e.g. corner angle may be an internal or external angle associated with the roof edge of the roof footprint.

As shown at block 1808 of FIG. 18, the apparatus 200 may include means, such as a processor 202, or the like, configured to determine candidate cutting lines. The processor 202 may determine candidate cutting lines by propagating lines between each of the respective POIs.

As shown at block 1810 of FIG. 18, the apparatus 200 may include means, such as a processor 202, or the like, configured to determine real cutting lines. The processor 202 may determine real cutting lines based on roof features, such as ridgelines on the aerial image. In an example embodiment, the processor 202 may receive real cutting lines from a user interface 208, such as in an instance in which the user manually enters the real cutting lines. Additionally or alternatively, real cutting lines may be entered or determined at a previous time and stored in a memory which the UE 102 may retrieve real cutting line information.

As shown at block 1812 of FIG. 18, the apparatus 200 may include means, such as a processor 202, or the like, configured to validate candidate cutting lines with real cutting lines. The processor 202 may validate candidate cutting lines which correlate, e.g. deviate by no more that a predefined angle or amount, with real cutting lines, for generation of segment combinations at block 1814.

In an example embodiment, the processor 202 may merge candidate cutting lines which are within a predetermined proximity of one another, such as by being substantially parallel to one another and spaced apart by no more than a predefined gap.

The validation of candidate cutting lines and merging of proximate cutting lines reduces the number of segment combinations generated at 1814, increasing processing efficiency and reducing classification complexity.

As shown at block 1814 of FIG. 18, the apparatus 200 may include means, such as a processor 202, or the like, configured to generate segment combinations. The processor 202 may generate segment combinations based on the real and/or candidate cutting lines. The processor 202 may generate segment combinations for each combination of cutting lines. In example embodiments, the processor 202 may generate segment combinations only for cutting line combinations that include some or all validated candidate cutting lines.

As shown at block 1816 of FIG. 18, the apparatus 200 may include means, such as a processor 202, or the like, configured to select a segment combination based on a probability threshold. The processor 202 may assign probability values to the respective segment combinations based on a correlation between one or more roof basic roof patterns. For example, roof patterns may have symmetry segments and right angles of ridgelines and cutting/edge lines and have greater correlation to block shaped buildings and standard roofs. In other examples, the roof patterns may have obtuse or acute angles and asymmetrical segments, and may have greater correlation to non-standard buildings and roofs. In this regard, the probability value may have a direct relationship to the correlation such that a greater correlation causes a greater probability value. The processor 202 may select the segment combination which has a probability value that satisfies the predetermined probability threshold. In an instance, in which two or more segment combinations satisfy the probability threshold, the processor 202 may select the segmentation with the highest probably value or select both or all of the segment combinations satisfying the probability threshold.

As shown at block 1818 of FIG. 18, the apparatus 200 may include means, such as a processor 202, or the like, configured to normalize roof segment scale. The processor 202 may compare the roof segment scale to a predetermined scale threshold. In an instance in which the roof segment scale fails to satisfy the predetermined scale threshold the roof segment scale is adjusted to satisfy the scale threshold. The normalization of the image ensures a uniform scale, such as 50×100 pixels, is used in the process to reduce errors.

In an example embodiment, the processor 202 may adjust the scale of irregular segments, e.g. segments which are not parallelograms or quadrilateral. The processor 202 may adjust the scale of the irregular segment to satisfy the predetermined scale threshold by, determining the minimum parallelogram, reshaping and resizing the parallelogram, applying a morphing transform and projecting the segment to an angle invariant circle, or the like.

As shown at block 1820 of FIG. 18, the apparatus 200 may include means, such as a processor 202, or the like, configured to determine roof features. The processor 202 may apply threshold segmentation to the aerial image to determine the roof features. The roof features may be readily detected due to visual contrast, or indicated by shadows, or other such secondary indicators.

Additionally or alternatively the UE 102 may use other edge detection methods, such as line segment detector (LSD), canny edge detector, sobel edge detector, or the like to generate the edge map.

As shown at block 1822 of FIG. 18, the apparatus 200 may include means, such as a processor 202, or the like, configured to determine if there are sufficient roof features in the roof segment for analysis. The processor 202 may compare the number roof segment roof features with a predetermined edge threshold. In an instance in which the roof segment fails to satisfy the edge threshold, the processor may rescale the roof segment by applying a mean shift at block 1818. In an instance in which the roof segment satisfies the edge threshold, the process may continue at block 1824 extraction of roof features.

In some example embodiments, the threshold segmentation applies at block 1820 may be a first threshold segmentation of a two part threshold segmentation. The second step of the two step threshold segmentation may be applied after the determination of sufficient roof features.

As shown at block 1824 of FIG. 18, the apparatus 200 may include means, such as a processor 202, or the like, configured to extract roof features. The processor 202 may apply a roof feature extractor, such as a histogram of oriented gradients (HOG), local binary pattern (LBP), spares coding, or the like.

As shown at block 1826 of FIG. 18, the apparatus 200 may include means, such as a processor 202, or the like, configured to classify roof segments based on the roof features. The processor may classify the roof segments based correlation of the roof segment features to a roof type pattern, e.g. basic roof type pattern or hard case roof type pattern. The process may continue at block 1828 with classification of the roof based on classification of roof segments or at block 1830 with generation of a three dimensional reconstruction based on the classified roof segments.

As shown at block 1828 of FIG. 18, the apparatus 200 may include means, such as a processor 202, or the like, configured to classify the roof based on the classification of roof segments. In an instance in which the roof includes multiple roof segments, the processor may validate the roof segment classifications by determining a roof classification of the roof as a whole or sub sections of the roof. In an instance in which one or more roof segment classifications fail to be validated, the processor 202 may reclassify the roof segment based on the classification of other roof segments.

In an example embodiment, the processor may receive validation of roof segment classifications from a user interface 208, in an instance in which the user manually validates the roof type classifications, such as during initial machine learning.

In an example embodiment, processor 202 may store the classifications of roof segments at block 1826 or classification of roofs at block 1828 in a memory 204. The classifications of roofs and roof images may be used in the classification of other roofs in a manner substantially similar to the roof type patterns.

As shown at block 1830 of FIG. 18, the apparatus 200 may include means such as a processor 202, or the like to generate a three dimensional reconstruction model of the roof based on the classification of the roof segments. The processor 202 may generate a reconstruction including a roof ridge frame based on the classification of the roof segments, the roof edge, and the ridge lines. In an example embodiment, the structure, e.g. reconstruction of the building, e.g. height and shape, is stored in a memory 204 and the processor appends the reconstruction of the roof to the reconstruction of the building structure, resulting in a composite three dimensional reconstruction of the building and roof.

The segmentation of roofs into smaller portions and classification of the segments may generate more accurate reconstruction of the roofs. The classification of different segments may additionally allow for more complex roofs to be classified and reconstructed. Additionally, the segmentation of the roofs may allow for the rendering of roofs with variant roof construction.

The use of a basic and complex roof classification system may allow for faster and more reliable classification and rendering. Additionally, the machine learning feedback of roof classification increases the accuracy of classification of roof segments.

As described above, FIG. 18 illustrates a flowchart of an apparatus 200, method, and computer program product according to example embodiments of the invention. It will be understood that each block of the flowchart, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as illustrated by the dashed outline of blocks 1804-1806, 1810-1814, 1818-1822, and 1828-1830 in FIG. 18. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   receiving a roof image;
   determining if roof features satisfy a predetermined edge threshold, wherein in an instance in which the roof image does not satisfy the predetermined edge threshold a mean shift is applied to the roof image;
   determining, using a processor, a segmentation of the roof image based on cutting lines associated with the roof features; and
   classifying roof segments based on the roof features within the roof segment, wherein the classifying of the roof segments is based on the roof features correlation to a roof type pattern.

2. The method of claim 1 further comprising:
   determining a plurality of points of interest associated with the roof image; and
   wherein the cutting lines are candidate cutting lines that are based on the points of interest.

3. The method of claim 2, wherein the roof image comprises a roof footprint; and
   wherein determining a point of interest comprises determining points at which the angle of the footprint satisfies a predetermined angle threshold.

4. The method of claim 1 further comprising:
   classifying the roof based on the roof segment classification.

5. The method of claim 1 further comprising:
   determining if at least a portion of the roof image satisfies a predetermined scale threshold, wherein in an instance in which the at least a portion of the roof image does not satisfy the predetermined scale threshold the roof image is adjusted to satisfy the predetermined scale threshold.

6. A method comprising:
   receiving a roof image;
   determining a plurality of points of interest associated with the roof image;
   determining candidate cutting lines based on the points of interest;
   determining, using a processor, a segmentation of the roof image based on the candidate cutting lines associated with roof features, wherein determining a segmentation of the roof image comprises determining a plurality of segment combinations based on the candidate cutting lines and points of interest;
   selecting a segment combination based on satisfying a predetermined probability threshold; and
   classifying roof segments based on roof features within the roof segment, wherein the classifying of the roof segments is based on the roof features correlation to a roof type pattern.

7. An apparatus comprising at least one processor and at least one memory including computer program code, the at least one memory and computer program code configured to, with the processor, cause the apparatus to at least:
   receive a roof image;
   determine if roof features satisfy a predetermined edge threshold, wherein in an instance in which the roof image does not satisfy the predetermined edge threshold a mean shift is applied to the roof image;
   determine a segmentation of the roof image based on cutting lines associated with the roof features; and
   classify roof segments based on the roof features within the roof segment, wherein the classifying of the roof segments is based on the roof features correlation to a roof type pattern.

8. The apparatus of claim 7, wherein the at least one memory and the computer program code are further configured to:
   determine a plurality of points of interest associated with the roof image; and
   wherein the cutting lines are candidate cutting lines that are based on the points of interest.

9. The apparatus of claim 8, wherein the roof image comprises a roof footprint; and
   wherein determining a point of interest comprises determining points at which the angle of the footprint satisfies a predetermined angle threshold.

10. The apparatus of claim 8, wherein the at least one memory and the computer program code are further configured to:
    determine candidate cutting lines based on the points of interest;
    wherein determining a segmentation of the roof image comprises determining a plurality of segment combinations based on the candidate cutting lines and points of interest; and
    select a segment combination based on satisfying a predetermined probability threshold.

11. The apparatus of claim 7, wherein the at least one memory and the computer program code are further configured to:
    classify the roof based on the roof segment classification.

12. The apparatus of claim 7, wherein the at least one memory and the computer program code are further configured to:
    determine if at least a portion of the roof image satisfies a predetermined scale threshold, wherein in an instance in which the at least a portion of the roof image does not satisfy the predetermined scale threshold the roof image is adjusted to satisfy the predetermined scale threshold.

13. A computer program product comprising at least one non-transitory computer-readable storage medium having computer-executable program code portions stored therein, the computer-executable program code portions comprising program code instructions configured to:

receive a roof image;

determine if roof features satisfy a predetermined edge threshold, wherein in an instance in which the roof image does not satisfy the predetermined edge threshold a mean shift is applied to the roof image;

determine a segmentation of the roof image based on cutting lines associated with roof features; and classify roof segments based on the roof features within the roof segment, wherein the classifying of the roof segments is based on the roof features correlation to a roof type pattern.

14. The computer program product of claim 13, wherein the computer-executable program code portions further comprise program code instructions configured to:

determine a plurality of points of interest associated with the roof image; and wherein the cutting lines are candidate cutting lines that are based on the points of interest.

15. The computer program product of claim 13, wherein the roof image comprises a roof footprint; and wherein determining a point of interest comprises determining points at which the angle of the footprint satisfies a predetermined angle threshold.

16. The computer program product of claim 13, wherein the computer-executable program code portions further comprise program code instructions configured to:

determine candidate cutting lines based on the points of interest;

wherein determining a segmentation of the roof image comprises determining a plurality of segment combinations based on the candidate cutting lines and points of interest; and select a segment combination based on satisfying a predetermined probability threshold.

17. The computer program product of claim 13, wherein the computer-executable program code portions further comprise program code instructions configured to:

classify the roof based on the roof segment classification.

18. The computer program product of claim 13, wherein the computer-executable program code portions further comprise program code instructions configured to:

determine if at least a portion of the roof image satisfies a predetermined scale threshold, wherein in an instance in which the at least a portion of the roof image does not satisfy the predetermined scale threshold the roof image is adjusted to satisfy the predetermined scale threshold.

* * * * *